Figure 1:
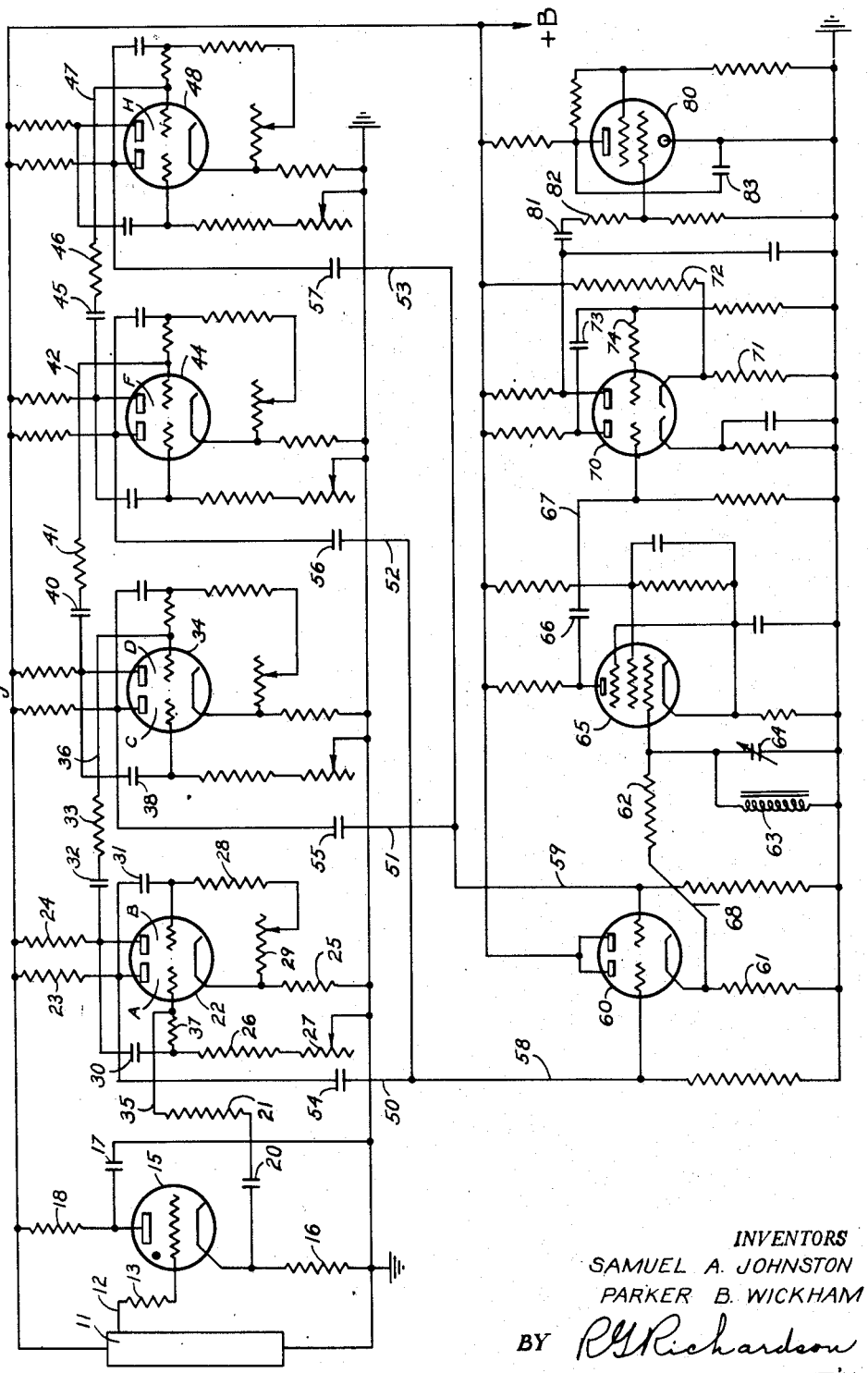

Nov. 10, 1953  S. A. JOHNSTON ET AL  2,658,381
APPARATUS FOR TIMING A BALANCE WHEEL ASSEMBLY
Filed Sept. 23, 1948  2 Sheets-Sheet 1

INVENTORS
SAMUEL A. JOHNSTON
PARKER B. WICKHAM
BY R.G. Richardson
ATT'Y

Patented Nov. 10, 1953

2,658,381

UNITED STATES PATENT OFFICE 2,658,381

APPARATUS FOR TIMING A BALANCE WHEEL ASSEMBLY

Samuel A. Johnston, Walworth, and Parker B. Wickham, Delavan, Wis., assignors to The George W. Borg Corporation, Chicago, Ill., a corporation of Delaware Application September 23, 1948, Serial No. 50,786

2 Claims. (Cl. 73—6)

The present invention relates in general to frequency multipliers, and more in particular to frequency multipliers for multiplying very low frequencies on the order of five cycles per second, and the object of the invention is a new and improved device of this character.

The invention is adapted for use in various situations, but is especially useful in connection with hairspring vibrating apparatus such as disclosed in Patent No. 2,231,849, granted February 11, 1941, to Thomas B. Gibbs et al. and in the pending application of Wickham, Serial No. 18,197, filed March 31, 1948, now Patent No. 2,624,194 issued January 6, 1953. Hairspring vibrating apparatus is used for timing and regulating the rate of balance wheels for watches and clocks.

The apparatus includes means for generating electrical currents responsive to the oscillation of a balance wheel under test and means associated therewith for producing output impulses having a frequency equal to the beat frequency of the wheel. These output impulses are transmitted to a suitable indicator by means of which the operator can tell if the rate of the balance wheel is correct or not. The indicator may be a stroboscopic indicator such as disclosed in the patent to Gibbs, No. 2,361,281, granted October 24, 1944, wherein the impulses produce flashes of light, seen by the operator as a spot of light which moves in one direction or the other depending on whether the balance wheel is fast or slow.

The apparatus described above has been used extensively and has given excellent service, but is subject to the objection that the output impulse frequency is so low, on the order of five impulses per second, that there is an appreciable flicker of the light spot at the indicator.

This objection is overcome by the use of the instant invention, whereby the frequency of the impulses derived from oscillation of the balance wheel is multiplied by a factor which will raise the frequency to a high enough value so that the persistency of vision will give the impression of a steady light spot. In the case of apparatus for regulating five beat balance wheels for clocks, for example, the five cycle output impulses may have their frequency multiplied by four, producing 20 cycle impulses for use in controlling the indicator.

The foregoing and other features of the invention will be described more in detail in the following specification, reference being had to the accompanying drawings, in which—

Figure 2:
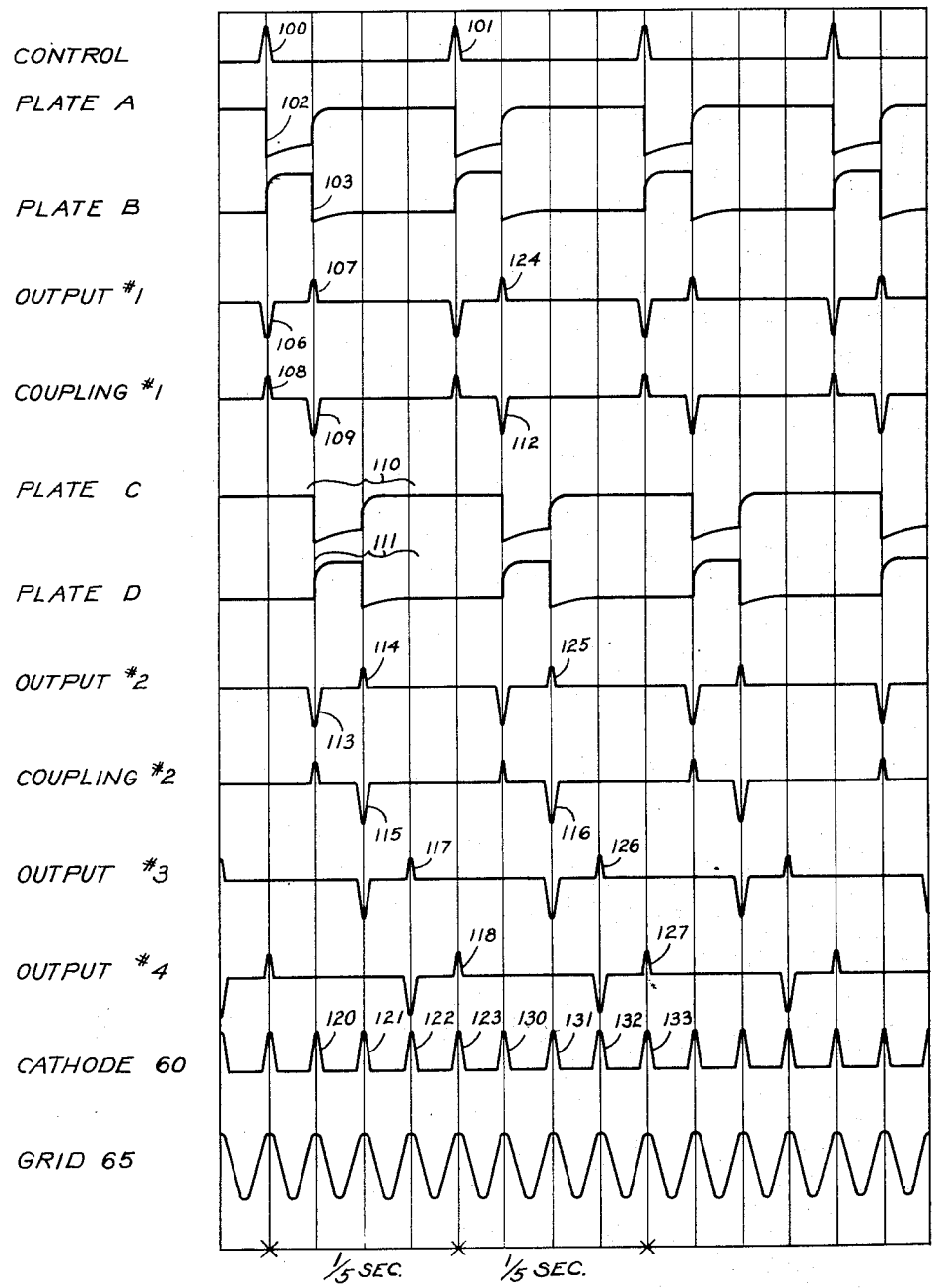

Fig. 1 is a diagrammatic circuit drawing showing the invention as applied to hairspring vibrating apparatus; and Fig. 2 is a chart showing voltage curves which will be utilized in explaining the operation of the invention.

Referring to the drawings, the rectangle indicated by the reference character 11, Fig. 1, represents apparatus such as disclosed in the Gibbs et al. patent previously referred to for generating electrical currents responsive to the oscillation of a balance wheel which with the associated hairspring is being tested and regulated. The currents are generated only during actual movement of the balance wheel and are utilized to maintain a negative potential on conductor 12 which drops to zero momentarily each time the balance wheel stops to reverse its direction of rotation.

Tube 15 may be a type 884 Thyratron tube and is controlled over conductor 12 during testing of a balance wheel to fire at beat frequency, as will be explained more in detail during the description of the operation.

Tube 22 may be a type 6SN7 double triode and is wired in accordance with a known circuit arrangement as a delay device, or single stroke multivibrator. As used herein the device operates to measure a time delay interval of 1/20 second. For a delay of this duration, the plate resistors 23 and 24 may have a resistance of 30 M ohms, the cathode resistor 25 a resistance of 10 M ohms, the grid resistors 26 and 28 a resistance of 75 M ohms, while the condensers 30 and 31 may have a capacity of .5 mfd. The exact length of the time delay interval may be adjusted by means of the rheostats 27 and 29.

The tubes 34, 44, and 48 may also be type 6SN7 double triodes and with their associated parts are wired the same as tube 22. That is, each of the tubes 34, 44, and 48 constitutes a delay device like tube 22, adapted to measure a time interval of 1/20 second.

The tube 60 may be another 6SN7 double triode and is connected to operate as a cathode follower. There is no plate resistor, or if a resister is used for protective purposes, it should have a low value. The cathode resistor 61 may have a resistance of 100 M ohms.

The inductance 63 and the variable condenser 64 constitute a tank circuit which may be tuned to a frequency of 20 cycles per second.

The tube 65 may be a type 6SJ7 pentode and is connected in well known manner to operate as an amplifier.

Tube 70 may be a type 6SN7 double triode, of which the left hand section is connected in the usual manner to operate as an amplifier. The right hand section has its cathode connected to the voltage divider comprising resistors 71 and 72, whereby the cathode is maintained at a potential of about 40 volts above ground potential and the section is biased below cut-off. The right hand section of tube 70 thus responds only to the positive half waves of voltages received from the left hand section by way of condenser 73 and is arranged to transmit impulses to the grid of tube 80.

Tube 80 may be a type 631P1 gas filled tube known as a "Strobotron" and is included in the indicator previously referred to, which also includes a suitable frequency standard. The indicator should be designed to have a scanning frequency which is appropriate for the frequency of the controlling impulses and in the present case may be 20 times per second.

It is understood that the necessary means for supplying current is provided, together with switches and such additional equipment as may be required for a complete installation.

The operation of the invention will now be explained, it being assumed for this purpose that a balance wheel with its associated hairspring is being tested and regulated. The balance wheel may be a five beat wheel and is preferably driven by puffs or impulses of air as described in the Wickham application previously referred to.

The apparatus represented by the rectangle 11 includes an optical system and photocell by means of which varying electrical currents are generated responsive to movement of the balance wheel, as previously mentioned. These currents are amplified and rectified to produce a negative potential which is transmitted to the grid of tube 15 by way of conductor 12 and resistor 13.

The negative potential on the grid of tube 15 renders the tube non-conductive. When the balance wheel stops to reverse its direction of rotation, however, the generation of varying photo electric current ceases, the negative potential at the grid of tube 15 disappears and the tube fires. When the tube fires, or becomes conductive, the condenser 17 discharges through the tube and the voltage at the plate is reduced to such a low value that the tube is extinguished. As the balance wheel picks up its motion on the next beat the negative potential again appears at the grid of the tube, while the condenser 17 charges and the plate voltage rises far enough to cause the tube to fire again when the balance wheel again stops to reverse its direction of rotation. Thus the tube 15 fires at the end of each beat of the balance wheel, or at beat frequency.

The two sections of tube 22 may be referred to as sections A and B, respectively, and the grid and plate elements likewise. Section B is normally passing current, grid B being connected to the cathode. Grid A is connected to ground and the positive potential on the cathode due to the drop across the cathode resistor 25 produces a negative bias on grid A, which prevents section A from passing current. This is a stable condition, in which the condenser 31 becomes charged to substantially the potential of the +B lead.

Each time tube 15 fires, the potential on its cathode rises suddenly and a positive impulse is transmitted by way of condenser 20, resistor 21, and conductor 35 to the grid A of tube 22.

These impulses are shown by means of the voltage curve labeled "Control," Fig. 2, and have a frequency of approximately 5 cycles per second, the exact frequency depending on the rate of the balance wheel being tested When impulse 100 is received at grid A of tube 22, section A starts to pass current and the potential on plate A drops suddenly, driving grid B negative due to the charged condition of condenser 31. The fall of potential at grid B decreases the current flow in section B which causes the potential at plate B to rise. The rise of potential at plate B raises the potential at grid A due to the coupling through condenser 30, which increases the current flow in section A and causes a further drop in potential at plate A. Thus a kind of regenerative action takes place whereby the voltage at plate A falls very quickly to a low value and the grid B attains a negative potential which biases section B below cut-off.

The condenser 30 now starts to charge through plate resistor 24 and condenser 31 starts to discharge through section A of the tube, whereby the voltage on plate B rises toward the +B potential and the potential on the grid B rises toward the cathode potential. After a short interval section B begins to pass current, the regenerative action is repeated and the tube returns quickly to its normal condition, in which section B is conductive and the grid of section A is biased below cut-off. This condition obtains until the next impulse 101 is received, whereupon the described operations are repeated.

The interval referred to above may be accurately adjusted by means of the rheostats 27 and 29, which are included in the circuits of condensers 30 and 31, respectively, and should be equal to $\frac{1}{20}$ second.

The voltage changes which take place at the plates of tube 22 are shown in the voltage curves labeled "Plate A" and "Plate B" in Fig. 2. The sharp voltage drops such as indicated at 102 which occur at plate A are coincidental with the control impulses such as 100. The similar sharp voltage drops such as 103 which take place at plate B are each delayed by $\frac{1}{20}$ second, as shown clearly by their displacement to the right by a distance equal to one-fourth the distance between impulses 100 and 101. These impulses, it will be recalled, are five beat impulses and hence are $\frac{1}{5}$ second apart on the time axis.

The voltage changes which take place at plate A cause impulses to be transmitted by way of the condenser 54, out-put conductor 50 and conductor 58 to the left hand grid of tube 60. The curve labeled "Output #1," Fig. 2, shows the nature of these impulses as they appear on conductor 50. A strong negative impulse 106 coincidental with the fall in plate potential indicated at 102 is followed $\frac{1}{20}$ second later by a positive impulse 107 of somewhat smaller amplitude. Another pair of impulses is transmtited $\frac{1}{5}$ second later, and so on.

The voltage changes which take place at plate B produce impulses which are transmitted by way of condenser 32, resistor 33, and conductor 36 to the grid D of section D of tube 34. The character of these impulses as they appear on conductor 36 is shown by the curve labeled "Coupling #1" in Fig. 2. A positive impulse 108 is followed $\frac{1}{20}$ second later by a strong negative impulse 109 and these impulses are repeated at $\frac{1}{5}$ second intervals.

At tube 34 section D is normally passing current while section C is non-conductive. When the positive impulse 108 is received at grid D it has no effect since section D is already passing current. When the negative impulse 109 is received, however, the current flow in section D is reduced, the voltage at plate D rises suddenly and a positive impulse is transmitted by way of condenser 38 to grid C of section C, which accordingly becomes conductive. Phenomena which are similar to those described in connection with tube 22 now take place at tube 34, it being immaterial whether the action is initiated by a positive impulse such as 108 received at the grid of a section such as A which is non-conductive or a negative impulse such as 109 which is received at the grid of a section such as D which is conductive.

The voltage changes which take place at the plates of tube 34 responsive to impulse 109 are shown at 110 and 111 in the curves labeled "Plate C" and "Plate D" in Fig. 2. Additional negative impulses such as 112 cause these voltage changes to be repeated every 1/5 second.

The voltage changes at plate C of tube 34 cause impulses to be transmitted by way of condenser 55, output conductor 51, and conductor 59 to the right hand grid of tube 60. These impulses are shown in the curve labeled "Output #2," Fig. 2, from which it will be seen that impulses 113 and 114 correspond to impulses 106 and 107 shown on the curve labeled "Output #1," but are displaced to the right by a distance corresponding to a time interval of 1/20 second.

The voltage changes at plate D of tube 34 are effective to produce impulses which are transmitted by way of condenser 40, resistor 41, and conductor 42 to the grid F, section F, of tube 44. The curve labeled "Coupling #2" in Fig. 2 shows that these impulses are similar to the impulses shown in the curve labeled "Coupling #1," but are out of phase or delayed by 1/20 second.

The negative impulses such as 115 and 116 cause the delay device comprising tube 44 to operate in the same way as has been described in the case of the two preceding delay devices. The voltage changes which take place at the plates are the same as shown in curves labeled plate C and plate D, Fig. 2, except that they are delayed by 1/20 second.

The delay device comprising tube 44 accordingly transmits impulses by way of condenser 56, conductor 52, and conductor 58 to the left hand grid of tube 60. These impulses are shown in the curve labeled "Output #3," in Fig. 2, and obviously are similar to the impulses of output #2.

The delay device comprising tube 44 also transmits impulses by way of condenser 45, resistor 46 and conductor 47 to the grid H of the delay device comprising tube 48. These impulses are the same as the impulses shown in the curve labeled coupling #2, except that they are delayed by 1/20 second and cause the delay device comprising tube 48 to operate in the same manner as the preceding delay devices.

Impulses are accordingly transmitted by way of condenser 57, conductor 53 and conductor 59 to the right hand grid of tube 60, as shown by the curve labeled output #4.

It will be seen from the foregoing that the four delay devices respond successively and at 1/20 second intervals to each control impulse such as 100 to transmit impulses over their respective output circuits. The impulses of output #1 and output #3 are transmitted over conductor 58 to the left hand grid of tube 60 while the impulses of output #2 and output #4 are transmitted over conductor 59 to the right hand grid of tube 60.

The grids of tube 60 are normally biased substantially to cut-off, due to a very small current flow through the tube, sufficient to maintain the cathode at a potential which is positive with respect to ground. The negative output impulses such as 106 and 113 have no effect, therefore.

When positive impulse 107 of output #1 is received at the left hand grid of tube 60, it drives the grid positive, causing the left hand section of the tube to become conductive and producing a sharp rise in the cathode potential, whereby an impulse is transmitted by way of conductor 68 and resistor 62 to the grid of tube 65.

Impulse 114 of output #2 is received at the right hand grid of tube 60 1/20 second later and produces another sharp rise in the cathode potential and the transmission of another impulse over the conductor 68 and resistor 62 to the grid of tube 65.

Impulse 117 of output #3 and impulse 118 of output #4 are received at the left hand and right hand grids, respectively, of tube 60 and cause the transmission of two more impulses over conductor 68, with the same 1/20 second spacing.

The curve labeled "Cathode 60" shows the above described impulses as they appear on the cathode of tube 60 and on the conductor 68. Impulses 120, 121, 122, and 123 are produced in response to the delay device output impulses 107, 114, 117, and 118, respectively, which in turn are produced in response to control impulse 100. Impulses 130, 131, 132 and 133 are produced in response to output impulses 124, 125, 126 and 127, responsive to control impulse 101, and so on, each control impulse being effective, through the medium of the four delay devices, to produce a series of four impulses transmitted to the grid of tube 65, as will readily be understood. The impulses of each series are 1/20 second apart and each series follows the preceding series by 1/20 second so the impulse frequency is 20 impulses per second.

The reason for the arrangement according to which the impulses of output #1 and the impulses of output #2 are transmitted over separate circuits, likewise the impulses of output #3 and the impulses of output #4, is to avoid the cancellation of the positive impulses which would otherwise take place. This will be clear from the impulse curves which show, for example, that the negative impulse 113 of output #2 is coincidental with the positive impulse 107 of output #1 and would cancel the latter impulse if it were attempted to transmit them over the same circuit.

The tank circuit comprising the inductance 63 and the variable condenser 64 is connected between the grid of tube 65 and ground and is tuned to oscillate at a frequency of 20 cycles per second. The 20 cycle impulses which are transmitted from the cathode of tube 60 to the grid of tube 65 as described are effective to maintain oscillatory currents in the tank circuit and consequently the voltage actually appearing at the grid is approximately of sinusoidal form, as depicted in the curve labeled grid 65. This is 20 cycle alternating current.

The tube 65 operates in known manner as an amplifier. Its plate circuit is coupled by means of condenser 66 and conductor 67 to the grid of the left hand section of tube 70. Said section also operates as an amplifier and has its plate circuit coupled to the grid in the right hand section of the tube by means of the condenser 73 and resistor 74.

The cathode in the right hand section of tube 70 is maintained at a positive potential of about 40 volts by a connection to a point on the voltage divider comprising resistors 71 and 72, whereby the grid is biased below cut-off. The negative half waves of the 20 cycle input to the grid are ineffective, therefore, but each positive half wave causes the right hand section to become conductive and produces a sharp drop in the potential at the plate, whereby negative impulses are transmitted by way of condenser 81 and resistor 82 to the control grid of the Strobotron tube 80 in the indicator.

Tube 80 is arranged to fire in response to negative impulses. Each time it fires the condenser 83 discharges through the tube and the voltage across the tube drops to such a low value that it is immediately extinguished. The condenser 83 then charges again preparatory to firing the tube again upon the receipt of the next impulse. Short light flashes are thus produced which are seen by the operator as a continuous spot of light.

If the rate of the balance wheel is correct the control impulses such as 100 and 101 which are produced by the firing of tube 15 will have a frequency of exactly 5 impulses per second. The interval between impulses will be $\frac{1}{5}$ second, and each series of 4 impulses produced at the cathode of tube 60 will start exactly $\frac{1}{20}$ second following the end of the preceding series. For example, the interval between impulses 123 and 130 will be the same as the interval between impulses 122 and 123, which is $\frac{1}{20}$ second. The result is that the successive series of impulses form a uniform continuous series of impulses having a frequency of 20 impulses per second and the output of tube 65 at conductor 67 is 20 cycle alternating current.

It follows from the foregoing that the impulses which are delivered to the indicator to fire the Strobotron tube 80 have a frequency of exactly 20 impulses per second and that the light spot produced will stand still, indicating that the rate of the balance wheel is correct, as was assumed to be the case. The light flashes have a frequency which is high enough so that the objectionable flicker which results from low frequency light flashes is entirely eliminated.

In practice the hairsprings are made too long, so the balance wheel will be slow and the hairspring will have to be shortened in order to make the rate correct. Assuming the wheel to be slow, therefore, the impulses such as 100 and 101 are separated by intervals slightly greater than $\frac{1}{5}$ second and the successive series of impulses produced at the cathode of tube 60 are slightly more than $\frac{1}{20}$ second part. The impulses of each series of four impulses still have a frequency of 20 impulses per second, however, although the increased spacing between impulses such as 123 and 130 makes the over-all frequency slightly less.

The effect at the indicator is a drift of the light spot to the left, indicating that the balance wheel is slow. If the tank circuit comprising the inductance 63 and condenser 64 is disconnected, the light spot moves by stages. The light flashes which result from impulses such as 120—123 maintain the light spot stationary for $\frac{1}{5}$ second whereupon it moves slightly to the left where it is maintained for another $\frac{1}{5}$ second, and so on. This is a considerable improvement over the low frequency flickering light spot.

The operation is further improved by the tank circuit, the effect of which is to introduce inertia into the system and produce a gradual shift of the light spot. The tank circuit also eliminates the slight to and fro movement of the light spot which may be caused, when the tank circuit is not present, by a difference in the length of the odd and even beats of the balance wheel.

The invention having been described, that which is believed to be new and for which the protection of Letters Patent is desired will be pointed out in the appended claims.

We claim:

1. Apparatus for timing a balance wheel having a low beat frequency, comprising means responsive to oscillation of said wheel for generating impulses of beat frequency, a stroboscopic indicator including impulse responsive means for producing a light spot which moves in one direction or the other depending on whether the received impulses are fast or slow, means responsive to each impulse generated by said wheel for generating a series of impulses having a higher frequency which is a multiple of the correct beat frequency, said series being spaced apart by time intervals which depend on the rate of said balance wheel and which are the same as the intervals between said multiple frequency impulses if the rate of the wheel is correct, a circuit over which impulses are transmitted to said indicator, and means responsive to said series of impulses for generating successive series of impulses in said circuit, whereby said light spot remains stationary during each series of received impulses and moves only at the beginning of each series if the rate of said wheel is incorrect.

2. Apparatus as claimed in claim 1, wherein the means for generating impulses in the indicator circuit includes a tuned circuit which tends to standardize the length of said time intervals if the rate of the wheel is incorrect and produces a gradual shift of said light spot.

SAMUEL A. JOHNSTON.
PARKER B. WICKHAM.

References Cited in the file of this patent

UNITED STATES PATENTS

| Number | Name | Date |
| --- | --- | --- |
| 2,231,849 | Gibbs et al. | Feb. 11, 1941 |
| 2,253,575 | Norton | Aug. 26, 1941 |
| 2,304,813 | Gibbs | Dec. 15, 1942 |
| 2,358,078 | Kohlagen | Sept. 12, 1944 |
| 2,361,281 | Gibbs | Oct. 24, 1944 |
| 2,374,343 | Gibbs et al. | Apr. 24, 1945 |
| 2,390,608 | Miller et al. | Dec. 11, 1945 |
| 2,424,481 | McCoy | July 22, 1947 |
| 2,425,165 | Usselman | Aug. 5, 1947 |
| 2,425,613 | Gibbs | Aug. 12, 1947 |
| 2,515,195 | Clark | July 18, 1950 |
| 2,537,077 | McVay et al. | Jan. 9, 1951 |
| 2,567,846 | Jacobsen | Sept. 11, 1951 |